(12) United States Patent
Wu et al.

(10) Patent No.: US 12,339,531 B2
(45) Date of Patent: Jun. 24, 2025

(54) LIQUID CRYSTAL DISPLAY PANEL AND LIQUID CRYSTAL DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Xiaohui Wu, Beijing (CN); Ming Xu, Beijing (CN); Ni Jiang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/261,263

(22) PCT Filed: Sep. 7, 2022

(86) PCT No.: PCT/CN2022/117572
§ 371 (c)(1),
(2) Date: Jul. 12, 2023

(87) PCT Pub. No.: WO2024/050720
PCT Pub. Date: Mar. 14, 2024

(65) Prior Publication Data
US 2024/0411160 A1    Dec. 12, 2024

(51) Int. Cl.
*G02F 1/13*   (2006.01)
*G02F 1/1335*   (2006.01)

(52) U.S. Cl.
CPC ........ *G02F 1/132* (2013.01); *G02F 1/133528* (2013.01)

(58) Field of Classification Search
None
See application file for complete search history.

(56) References Cited

U.S. PATENT DOCUMENTS 10,795,199 B2    10/2020   Zhao et al.
2005/0073640 A1    4/2005   Dunn et al.

FOREIGN PATENT DOCUMENTS

CN    103607796 A    2/2014
CN    205594258 U    9/2016
(Continued)

OTHER PUBLICATIONS

International Search Report and Written Opinion in Chinese dated Jun. 2, 2023, for corresponding PCT Application No. PCT/CN2022/117572.

*Primary Examiner* — Phu Vu
(74) *Attorney, Agent, or Firm* — Kinney & Lange, P.A.

(57) ABSTRACT

A liquid crystal display panel is provided, including: a first substrate; a second substrate opposite to the first substrate; a liquid crystal layer between the first substrate and the second substrate; and a heating electrode layer on a side of the first substrate away from the second substrate. The heating electrode layer includes a plurality of heating electrodes respectively used to heat liquid crystals in the liquid crystal layer. The first substrate includes a first region and a second region, the first region is closer to a side edge of the first substrate than the second region. The plurality of heating electrodes include a first heating electrode in the first region and at least one second heating electrode in the second region, and a heating power of the first heating electrode is greater than a heating power of each of the at least one second heating electrode.

19 Claims, 8 Drawing Sheets

(56) References Cited

FOREIGN PATENT DOCUMENTS

| | | | |
|---|---|---|---|
| CN | 108983476 | A | 12/2018 |
| CN | 209858890 | U * | 12/2019 |
| CN | 111694181 | A | 9/2020 |
| CN | 113189810 | A | 7/2021 |
| JP | S57192927 | A | 11/1982 |
| JP | H05173153 | A | 7/1993 |
| JP | 2001100235 | A | 4/2001 |
| JP | 2004093886 | A | 3/2004 |

* cited by examiner

LIQUID CRYSTAL DISPLAY PANEL AND LIQUID CRYSTAL DISPLAY DEVICE

CROSS-REFERENCE TO RELATED APPLICATION

This application is a Section 371 National Stage Application of International Application No. PCT/CN2022/117572, filed Sep. 7, 2022, entitled "LIQUID CRYSTAL DISPLAY PANEL AND LIQUID CRYSTAL DISPLAY DEVICE", which is incorporated herein by reference in its entirety.

TECHNICAL FIELD

The present disclosure relates to a field of a display technology, in particular to a liquid crystal display panel and a liquid crystal display device.

BACKGROUND

Liquid crystal display panels have been widely used in recent years. A liquid crystal display panel used in a vehicle electronic rearview mirror generally operates in a low-temperature environment. In order to ensure an imaging time and an image display quality of the vehicle electronic rearview mirror, it is generally needed to heat liquid crystals in the liquid crystal display panel. For existing heating solutions, in the low-temperature environment, a heat dissipation at a peripheral portion of the liquid crystal display panel is fast, and then a temperature at the peripheral portion is lower than a temperature at a middle portion of the liquid crystal display panel. There is also a problem of non-uniform temperature in a display area.

Therefore, how to design a structure of the liquid crystal display panel to balance a heating efficiency and a temperature uniformity of the liquid crystal display panel has gradually become one of important topics faced by those skilled in the art.

The above information disclosed in this section is merely for the understanding of the background of technical concepts of the present disclosure. Therefore, the above information may contain information that does not constitute a related art.

SUMMARY

In order to solve at least one aspect of the above-mentioned problems, the embodiments of the present disclosure provide a liquid crystal display panel and a liquid crystal display device including the liquid crystal display panel.

In an aspect, a liquid crystal display panel is provided, including: a first substrate; a second substrate opposite to the first substrate; a liquid crystal layer between the first substrate and the second substrate; and a heating electrode layer on a side of the first substrate away from the second substrate. The heating electrode layer includes a plurality of heating electrodes respectively configured to heat liquid crystals in the liquid crystal layer. The first substrate includes a first region and a second region, and the first region is closer to a side edge of the first substrate than the second region. The plurality of heating electrodes include a first heating electrode in the first region and at least one second heating electrode in the second region, and a heating power of the first heating electrode is greater than a heating power of each of the at least one second heating electrode.

According to some exemplary embodiments, the first substrate includes a first surface away from the second substrate, and the heating electrode layer is in direct contact with the first surface.

According to some exemplary embodiments, the liquid crystal display panel further includes: a backlight module on the side of the first substrate away from the second substrate; and a first polarizer between the backlight module and the first substrate, where the heating electrode layer is between the first polarizer and the first substrate.

According to some exemplary embodiments, an area of an orthographic projection of the first heating electrode on the first surface is greater than an area of an orthographic projection of each of the at least one second heating electrode on the first surface.

According to some exemplary embodiments, the first heating electrode includes a loop-like electrode in the first region; and the second heating electrode includes a strip-like electrode in the second region.

According to some exemplary embodiments, the heating electrode layer includes a plurality of heating electrode groups, and at least one of the plurality of heating electrode groups includes a plurality of second heating electrodes and a plurality of connecting portions. In the at least one heating electrode group, the plurality of second heating electrodes and the plurality of connecting portions are arranged alternately in a first direction, and two adjacent second heating electrodes are electrically connected by the connecting portion. The plurality of heating electrode groups are arranged and spaced apart in a second direction, the second direction being different from the first direction.

According to some exemplary embodiments, in the at least one heating electrode group, areas of orthographic projections of the plurality of second heating electrodes on the first surface decrease in a direction from the side edge of the first substrate to a center of the first substrate.

According to some exemplary embodiments, each of the plurality of second heating electrodes has a first size in the first direction, and in the at least one heating electrode group, the first sizes of the plurality of second heating electrodes decrease in the direction from the side edge of the first substrate to the center of the first substrate.

According to some exemplary embodiments, each of the plurality of second heating electrodes has a second size in the second direction, and in the at least one heating electrode group, the second sizes of the plurality of second heating electrodes are substantially equal.

According to some exemplary embodiments, the first substrate includes a first side edge and a second side edge, and the first side edge and the second side edge are disposed opposite to each other in the first direction. The first heating electrode includes a first electrode portion close to the first side edge and a second electrode portion close to the second side edge. The first electrode portion is configured to receive a first voltage, the second electrode portion is configured to receive a second voltage, and the first voltage is higher than the second voltage.

According to some exemplary embodiments, each of the plurality of heating electrode groups has one end in the first direction connected to the first electrode portion, and the other end in the first direction connected to the second electrode portion.

According to some exemplary embodiments, in the at least one heating electrode group, a difference between first sizes of two adjacent second heating electrodes is in a range of 20 to 30 microns; and/or the first size A of each second heating electrode is in a range of 300 to 500 microns;

and/or the second size of each second heating electrode is in a range of 60 to 100 microns; and/or a spacing distance between two adjacent heating electrode groups in the second direction is in a range of 10 to 20 microns; and/or a size of the connecting portion in the first direction is in a range of 10 to 15 microns; and/or a size of the connecting portion in the second direction is in a range of 6 to 8 microns.

According to some exemplary embodiments, the heating electrode layer includes a plurality of heating electrode groups, and at least one of the plurality of heating electrode groups include a plurality of second heating electrodes and a plurality of connecting portions. In the at least one heating electrode group, the plurality of second heating electrodes and the plurality of connecting portions are arranged alternately in a second direction, and two adjacent second heating electrodes are electrically connected by the connecting portion. The plurality of heating electrode groups are arranged and spaced apart in a first direction, the second direction being different from the second direction.

According to some exemplary embodiments, in the at least one heating electrode group, areas of orthographic projections of the plurality of second heating electrodes on the first surface decrease in a direction from the side edge of the first substrate to a center of the first substrate.

According to some exemplary embodiments, each of the plurality of second heating electrodes has a second size in the second direction; and in the at least one heating electrode group, the second sizes of the plurality of second heating electrodes decrease in the direction from the side edge of the first substrate to the center of the first substrate.

According to some exemplary embodiments, each of the plurality of second heating electrodes has a first size in the first direction; and in the at least one heating electrode group, the first sizes of the plurality of second heating electrodes are substantially equal.

According to some exemplary embodiments, the first substrate includes a third side edge and a fourth side edge, and the third side edge and the fourth side edge are disposed opposite to each other in the second direction; the first heating electrode includes a third electrode portion close to the third side edge and a fourth electrode portion close to the fourth side edge; and the third electrode portion is configured to receive a first voltage, the fourth electrode portion is configured to receive a second voltage, and the first voltage is higher than the second voltage.

According to some exemplary embodiments, each of the plurality of heating electrode groups has one end in the second direction connected to the third electrode portion, and the other end in the second direction connected to the fourth electrode portion.

According to some exemplary embodiments, in the at least one heating electrode group, a difference between the second sizes of two adjacent second heating electrodes is in a range of 20 to 30 microns; and/or the second size of each second heating electrode is in a range of 300 to 500 microns; and/or the first size of each second heating electrode is in a range of 60 to 100 microns; and/or a spacing distance between two adjacent heating electrode groups in the first direction is in a range of 10 to 20 microns; and/or a size of the connecting portion in the second direction is in a range of 10 to 15 microns; and/or the size of the connecting portion in the first direction is in a range of 6 to 8 microns.

According to some exemplary embodiments, the first heating electrode includes a U-shaped electrode in the first region; and the second heating electrode includes a U-shaped electrode in the second region.

According to some exemplary embodiments, a plurality of second heating electrodes form at least one heating electrode group. The first heating electrode is connected to a first voltage source, the at least one heating electrode group is connected to a second voltage source, and a voltage supplied by the first voltage source is different from a voltage supplied by the second voltage source.

According to some exemplary embodiments, the first heating electrode has a first size in a first direction and a second size in a second direction. At least one second heating electrode has a first size in the first direction and a second size in the second direction. The first size of the first heating electrode is greater than the first size of the second heating electrode, and/or the second size of the first heating electrode is greater than the second size of the second heating electrode.

According to some exemplary embodiments, the liquid crystal display panel further includes a first pin portion covering a first side edge of the first substrate and a second pin portion covering a second side edge of the first substrate.

According to some exemplary embodiments, each of the first pin portion and the second pin portion includes a first pin sub-portion, a second pin sub-portion and a third pin sub-portion, and the first pin sub-portion and the third pin sub-portion is connected by the second pin sub-portion. The first pin sub-portion is on a surface of the heating electrode layer away from the first substrate, the third pin sub-portion is on a surface of the first substrate close to the second substrate, and the second pin sub-portion is disposed facing the first side edge or the second side edge of the first substrate.

According to some exemplary embodiments, a plurality of first pin sub-portions are spaced apart in a second direction, a plurality of second pin sub-portions are spaced apart in the second direction, and a plurality of third pin sub-portions are continuous in the second direction.

According to some exemplary embodiments, the liquid crystal display panel further includes a first pin portion covering a third side edge of the first substrate and a second pin portion covering a fourth side edge of the first substrate.

According to some exemplary embodiments, each of the first pin portion and the second pin portion includes a first pin sub-portion, a second pin sub-portion and a third pin sub-portion, and the first pin sub-portion and the third pin sub-portion is connected by the second pin sub-portion. The first pin sub-portion is on a surface of the heating electrode layer away from the first substrate, the third pin sub-portion is on a surface of the first substrate close to the second substrate, and the second pin sub-portion is disposed opposite to the third side edge or the fourth side edge of the first substrate.

According to some exemplary embodiments, a plurality of first pin sub-portions are spaced apart in a first direction, a plurality of second pin sub-portions are spaced apart in the first direction, and a plurality of third pin sub-portions are continuous in the first direction.

According to some exemplary embodiments, the liquid crystal display panel further includes a first pin portion, a second pin portion, a third pin portion and a fourth pin portion, and the first pin portion, the second pin portion, the third pin portion and the fourth pin portion cover a same side edge of the first substrate. The first pin portion and the second pin portion are respectively connected to both ends of the first heating electrode, and the third pin portion and the fourth pin portion are respectively connected to both ends of at least one heating electrode group. Each of the first pin portion, the second pin portion, the third pin portion and the fourth pin portion includes a first pin sub-portion, a second pin sub-portion and a third pin sub-portion, and the first pin sub-portion and the third pin sub-portion is connected by the second pin sub-portion.

According to some exemplary embodiments, the liquid crystal display panel further includes a first lead wire configured to receive a first voltage and a second lead wire configured to receive a second voltage. The second pin sub-portion of the first pin portion is connected to the first lead wire, and the second pin sub-portion of the second pin portion is connected to the second lead wire.

According to some exemplary embodiments, the liquid crystal display panel further includes a first lead wire, a second lead wire, a third lead wire and a fourth lead wire, the first lead wire and the second lead wire are connected to a first voltage source, and the third lead wire and the fourth lead wire are connected to a second voltage source. The second pin sub-portion of the first pin portion is connected to the first lead wire, the second pin sub-portion of the second pin portion is connected to the second lead wire, the second pin sub-portion of the third pin portion is connected to the third lead wire, and the second pin sub-portion of the fourth sub-portion is connected to the fourth lead wire.

According to some exemplary embodiments, in the first direction, an edge of the heating electrode layer is closer to the side edge of the first substrate than an edge of the first polarizer; and/or in the second direction, the edge of the heating electrode layer is closer to the side edge of the first substrate than the edge of the first polarizer.

According to some exemplary embodiments, a material of the heating electrode includes ITO or IZO.

In another aspect, a liquid crystal display device is provided, including the liquid crystal display panel described above.

BRIEF DESCRIPTION OF THE DRAWINGS

With following descriptions of the present disclosure with reference to the accompanying drawings, other objectives and advantages of the present disclosure may be obvious and the present disclosure would be understood comprehensively.

Figure 1A:
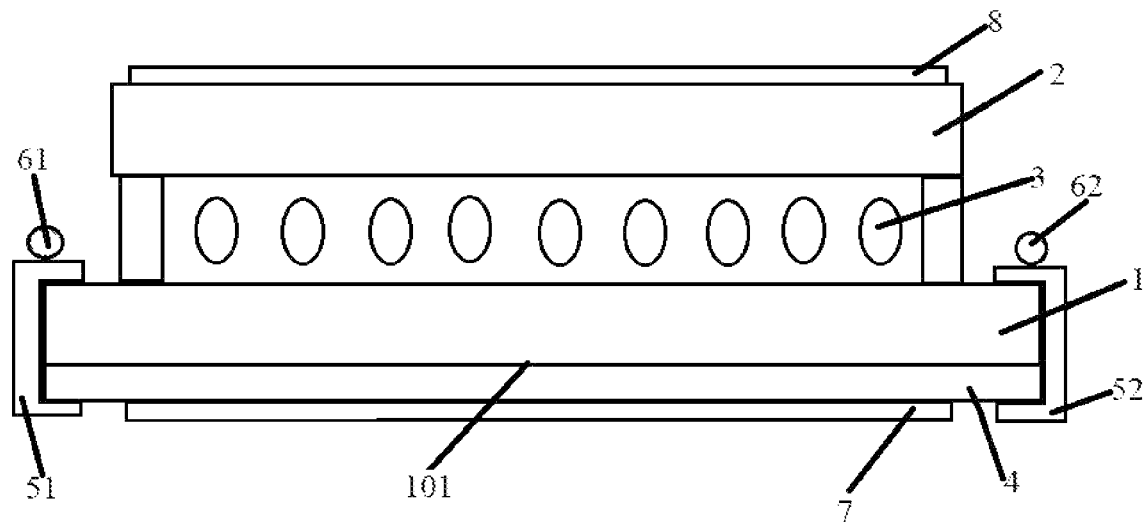
FIG. 1A shows a schematic structural diagram of a liquid crystal display panel according to an embodiment of the present disclosure.

It should be noted that for the sake of clarity, sizes of layers, structures or regions may be enlarged or reduced in the figures used to describe the embodiments of the present disclosure, that is, these figures are not drawn according to actual scale.

DETAILED DESCRIPTION OF EMBODIMENTS

Technical solutions of the present disclosure will be further described in detail below through the embodiments with reference to the accompanying drawings. In the specification, the same or similar reference numerals represent the same or similar components. The following descriptions of the embodiments of the present disclosure with reference to the accompanying drawings are intended to explain a general inventive concept of the present disclosure, and should not be understood as a limitation to the present disclosure.

In addition, in the following detailed descriptions, for the convenience of explanation, many specific details are set forth to provide a comprehensive understanding of the embodiments of the present disclosure. Obviously, however, one or more embodiments may also be implemented without these specific details.

It should be understood that, although the terms "first," "second" and so on may be used here to describe different elements, these elements should not be limited by these terms. These terms are merely used to distinguish one element from another element. For example, without departing from the scope of the exemplary embodiments, a first element may be named as a second element, and likewise, a second element may be named as a first element. The term "and/or" as used here includes any and all combinations of one or more related listed items.

It should be understood that when an element or layer is referred to as being "formed on" another element or layer, that element or layer may be directly or indirectly formed on the another element or layer. That is, for example, there may be an intermediate element or an intermediate layer. In contrast, when an element or layer is referred to as being "directly formed on" another element or layer, there is no intermediate element or layer. Other terms used to describe a relationship between elements or layers (for example, "between" and "directly between", "adjacent to" and "directly adjacent to", etc.) should be interpreted in a similar manner.

Herein, directional expressions "first direction" and "second direction" are used to describe different directions, e.g., a horizontal direction and a vertical direction. It should be understood that such expressions are merely exemplary descriptions and not limitations to the present disclosure.

Herein, unless otherwise specified, the expression "located in the same layer" generally means that a first component and a second component may be made of the same material and may be formed by the same patterning process. The expression "A and B are connected as a whole" means that component A and component B are integrally formed, that is, they generally include the same material and are formed as a structurally continuous integral component.

Herein, unless otherwise specified, directional terms such as "upper", "lower", "left". "right", "inside", "outside", etc. are used to indicate orientations or positional relationships shown based on the accompanying drawings, which is intended to facilitate the descriptions of the present disclosure and not to indicate or imply that the device, element or component referred to must have a specific orientation or must be constructed or operated in a specific orientation. It should be understood that when an absolute position of a described object changes, the relative positional relationships indicated by those terms may also change accordingly. Therefore, those directional terms may not be understood as limitations to the present disclosure.

Herein, the expressions "vertical", "vertically connected" or similar expressions not only indicate a case of 90 degrees, i.e., a case of being completely vertical, but also indicate a case of being different from 90 degrees within an error range, such as a case of being different from 90 degrees within a process error range.

With an increasing market demand and widespread application of vehicle electronic rearview mirrors, users have put forward stricter requirements for a response time of an electronic rearview mirror. In order to ensure the imaging time and image display quality of the electronic rearview mirror, a gray-scale response time of a liquid crystal display device needs to be less than 60 ms in a low-temperature environment. With a decrease in an ambient temperature, a flow viscosity of liquid crystals may sharply decrease, and the response time may be significantly prolonged and may not meet the requirement of less than 60 ms for the response time. Therefore, in the low-temperature environment, it is required to rapidly increase the temperature of the liquid crystal display within a range of 30 seconds to 1 minute, so that a response speed of the liquid crystals may be accelerated, and a user demand may be met. Furthermore, users also have requirements for heating power and heating efficiency, and it is desired to achieve a reduction of the response time, with a shorter time (such as 20 seconds) and a lower power consumption.

For existing heating solutions, in the low-temperature environment, a heat dissipation at a peripheral portion is fast, and then a temperature at the peripheral portion is lower than a temperature at a middle portion. There is also a problem of non-uniform temperature in a display area. In addition, in the existing heating solutions, a layer of heating electrodes is prepared on a glass substrate, and the substrate with the heating electrodes is bonded to a panel by using OCR (optical clear resin), so that an overall module structure is thick. In view of this, in the embodiments of the present disclosure, a first substrate is partition-optimized, and the heating electrode is prepared on a back of an array substrate so as to reduce a bonding process and thin the module structure, thereby improving the heating efficiency and heating uniformity of the liquid crystal display device.

FIG. 1A shows a schematic structural diagram of a liquid crystal display panel according to an embodiment of the present disclosure. Referring to FIG. 1A, the liquid crystal display panel may include a first substrate 1, a second substrate 2, a liquid crystal layer 3, and a heating electrode layer 4.

Specifically, the first substrate 1 and the second substrate 2 may be an array substrate and a color filter substrate, respectively. For example, the array substrate and the color filter substrate are disposed opposite to each other, and the liquid crystal layer 3 may be disposed between the array substrate and the color filter substrate. It should be understood that a base substrate of the color filter substrate and a base substrate of the array substrate may be glass substrates. In addition, it is worth noting that the color filter substrate and the array substrate may adopt a structure of a common color filter substrate and a structure of a common array substrate in the art, which will not be described in detail here.

Referring to FIG. 1A, the heating electrode layer 4 may be disposed on a side of the first substrate 1 away from the second substrate 2. Optionally, for example, the first substrate 1 may include a first surface 101 away from the second substrate 2, and the heating electrode layer may be in direct contact with the first surface 101. Since the heating electrode is in direct contact with the first surface 101 of the first substrate 1, the bonding process may be reduced, and an alignment accuracy may be improved. Furthermore, the heating electrode is closer to the liquid crystals, so that the heating efficiency may be improved. In addition, since the OCR bonding process is not required, it is possible to omit a layer of glass substrate and a layer of OCR, so that an overall module thickness may be reduced.

Figure 1B:
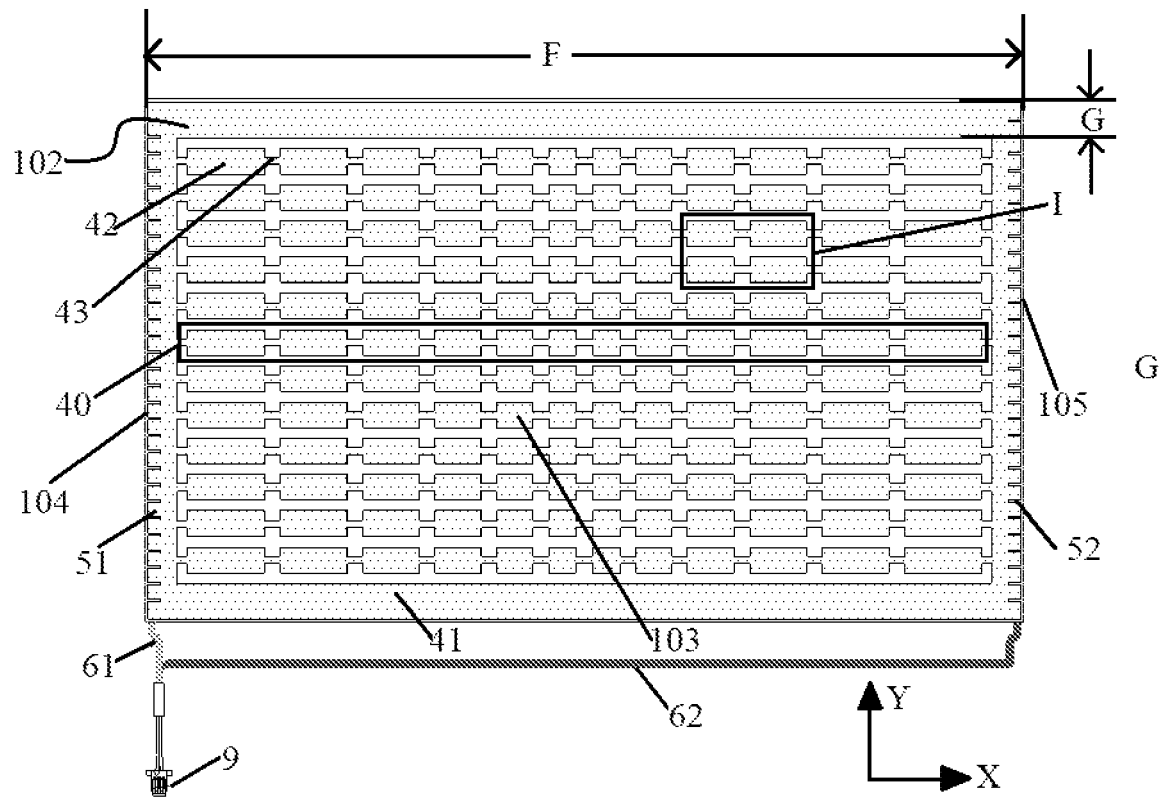
FIG. 1B shows a plan view of a first substrate according to an embodiment of the present disclosure.

FIG. 1B shows a plan view of a first substrate according to an embodiment of the present disclosure.

Referring to FIG. 1B, the first substrate 1 may include a first region 102 and a second region 103, and the first region 102 is closer to a side edge of the first substrate 1 than the second region 103. Specifically, the first region 102 may be surrounding edges of the first substrate 1, and the second region 103 may be an internal mesh-like region enclosed by the surrounding edges of the first substrate 1.

In the embodiments of the present disclosure, the heating electrode layer 4 may include a plurality of heating electrodes. For example, the heating electrode layer 4 may include a first heating electrode 41 disposed in the first region 102 and at least one second heating electrode 42 disposed in the second region 103. The first heating electrode 41 may be a loop-like whole surrounding the first substrate 1, and the second heating electrode 42 may be strip-like. An area of an orthographic projection of the first heating electrode 41 on the first surface 101 of the first substrate 1 may be greater than an area of an orthographic projection of each of the at least one second heating electrode on the first surface 101.

In the embodiments of the present disclosure, the plurality of heating electrodes may respectively heat liquid crystals in the liquid crystal layer 3. Optionally, when heating the liquid crystals, it is possible to set the heating power of the heating electrode according to a position of the liquid crystal. For example, the heating power of the first heating electrode 41 may be set to be greater than the heating power of each of the at least one second heating electrode. In this way, when heating the liquid crystal display panel, the temperature at the surrounding edges of the liquid crystal display panel may be increased, and the heating speed may also be increased, so as to solve the problem of fast heat dissipation at the peripheral portion of the liquid crystal display panel in the related art, which may in turn improve a thermal uniformity of the liquid crystal display panel.

Referring to FIG. 1B, the heating electrode layer 4 may further include a plurality of heating electrode groups 40, and at least one heating electrode group 40 includes a plurality of second heating electrodes 42 and a plurality of connecting portions 43. In the at least one heating electrode group 40, the plurality of second heating electrodes 42 and the plurality of connecting portions 43 are arranged alternately in a first direction, and two adjacent second heating electrodes 42 are electrically connected via a connecting portion 43. The plurality of heating electrode groups 40 are arranged and spaced apart in a second direction different from the first direction. For example, the first direction may be a horizontal direction, such as the X direction in FIG. 1B, and the second direction may be a vertical direction, such as the Y direction in FIG. 1B.

In the embodiments of the present disclosure, in the at least one heating electrode group 40, areas of orthographic projections of the plurality of second heating electrodes 42 on the first surface 101 may decrease in a direction from a side edge of the first substrate 1 to a center of the first substrate 1.

Optionally, each second heating electrode 42 may have a first size A in the X direction, such as a length of the heating electrode in the X direction; in the at least one heating electrode group 40, the lengths of the heating electrodes of the plurality of second heating electrodes 42 may decrease in the direction from the side edge of the first substrate 1 to the center of the first substrate 1.

Optionally, each second heating electrode 42 may have a second size B in the Y direction, such as a line width of the heating electrode; in the at least one heating electrode group 40, the line widths of the heating electrodes of the plurality of second heating electrodes 42 may be substantially equal.

Figure 1C:
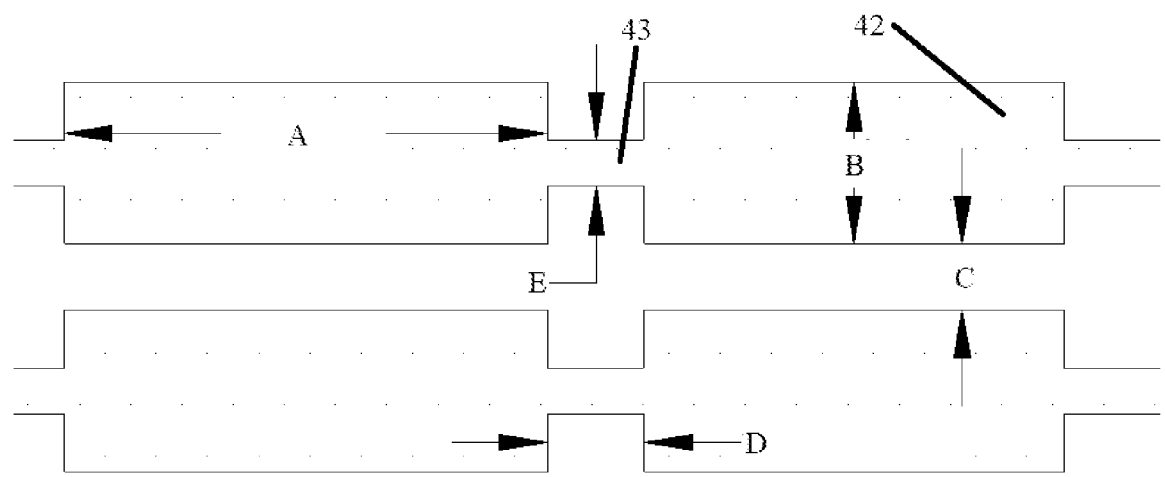
FIG. 1C shows an enlarged view of part I in FIG. 1B.

FIG. 1C shows an enlarged view of part I in FIG. 1B.

Referring to FIG. 1C, specifically, in the at least one heating electrode group 40, a difference between the first sizes A of two adjacent second heating electrodes 42 is in a range of 20 to 30 microns; and/or the first size A of each second heating electrode is in a range of 300 to 500 microns; and/or the second size B of each second heating electrode is in a range of 60 to 100 microns; and/or a spacing distance C between two adjacent heating electrode groups in the second direction is in a range of 10 to 20 microns; and/or a size D of the connecting portion 43 in the first direction is in a range of 10 to 15 microns; and/or a size E of the connecting portion 43 in the second direction is in a range of 6 to 8 microns.

In the embodiments of the present disclosure, the first heating electrode 41 may have a first size F in the first direction (the X direction) and a second size G in the second direction (the Y direction). The at least one second heating electrode 42 may have the first size A in the first direction (the X direction) and the second size B in the second direction (the Y direction). The first size F of the first heating electrode 41 is greater than the first size A of the second heating electrode 42, and/or the second size G of the first heating electrode 41 is greater than the second size B of the second heating electrode 42.

In the embodiments of the present disclosure, the first substrate 1 may include a first side edge 104 and a second side edge 105, which may be disposed opposite to each other in the first direction (X direction). The first heating electrode 41 may include a first electrode portion close to the first side edge 104 and a second electrode portion close to the second side edge 105. The first electrode portion may be configured to receive to a first voltage, and the second electrode portion may be configured to receive a second voltage, where the first voltage may be higher than the second voltage. Optionally, the first voltage may also be lower than the second voltage. When the circuit is connected, one end of each heating electrode group 40 in the first direction (the X direction) is connected to the first electrode portion, and the other end of each heating electrode group in the first direction (the X direction) is connected to the second electrode portion.

In the embodiments of the present disclosure, the first substrate is divided into regions, and the heating electrode in the first region is provided as a whole with a high resistance. When a same current is applied, the temperature of the first region rises quickly, so that the heat loss of the peripheral portion may be balanced in the low-temperature environment. The heating electrodes in the second region are strip-like, where the areas of the orthographic projections of the heating electrodes on the first surface or the first sizes of the heating electrodes decrease in the direction from the side edge of the first substrate to the center of the first substrate, which may be understood as that the areas of the orthographic projections of the heating electrodes gradually decrease from the peripheral portion to the middle portion along a positive-negative electric field direction, so that the heating efficiencies at various positions in the display area of the liquid crystal display panel may be balanced during the heating, and the consistency of temperature of the liquid crystal display panel may be maintained, thereby solving the problem that the temperature at the peripheral portion is lower than the temperature at the middle portion as the heat dissipation at the peripheral portion is faster in the low-temperature environment and the problem that the temperature in the display area is non-uniform. According to the requirements of different users for heating efficiency, heating power and temperature uniformity of liquid crystal display devices, the first size A, the second size B, the spacing distance C in the second direction, the size D in the first direction and the size E in the second direction may be adjusted to optimize the display effect of the liquid crystal display device.

Figure 2:
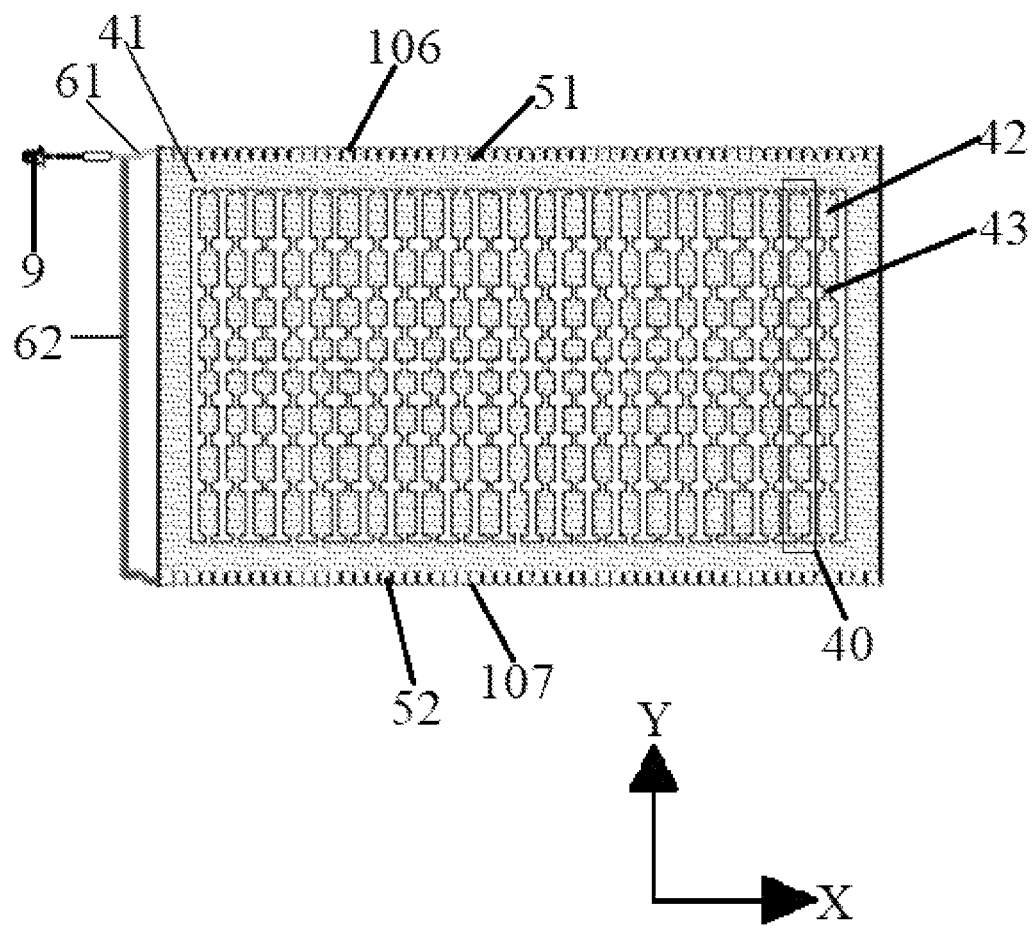
FIG. 2 shows a plan view of a first substrate according to some other embodiments of the present disclosure.

FIG. 2 shows a plan view of a first substrate according to some other embodiments of the present disclosure.

Referring to FIG. 2, the heating electrode layer 4 may include a plurality of heating electrode groups 40, and at least one heating electrode group 40 includes a plurality of second heating electrodes 42 and a plurality of connecting portions 43. In the at least one heating electrode group 40, the plurality of second heating electrodes 42 and the plurality of connecting portions 43 are arranged alternately in the second direction (the Y direction), and two adjacent second heating electrodes 42 are electrically connected by a connecting portion 43. The plurality of heating electrode groups 40 are arranged and spaced apart in the first direction (the X direction). The second direction is different from the first direction.

In the embodiments of the present disclosure, in the at least one heating electrode group 40, the areas of the orthographic projections of the plurality of second heating electrodes 42 on the first surface 101 decrease in the direction from the side edge of the first substrate 1 to the center of the first substrate 1.

Optionally, each second heating electrode 42 may have a second size B in the second direction (the Y direction). In the at least one heating electrode group 40, the second sizes B of the plurality of second heating electrodes 42 may decrease in the direction from the side edge of the first substrate 1 to the center of the first substrate 1.

Optionally, each second heating electrode 42 may have a first size A in the first direction (the X direction). In the at least one heating electrode group 40, the first sizes A of the plurality of second heating electrodes 42 may be substantially equal.

Specifically, in the at least one heating electrode group 40, a difference between the second sizes B of two adjacent second heating electrodes 42 is in a range of 20 to 30 microns; and/or the second size B of each second heating electrode 42 is in a range of 300 to 500 microns; and/or the first size A of each second heating electrode 42 is in a range of 60 to 100 microns; and/or a spacing distance C between two adjacent heating electrode groups 40 in the first direction is in a range of 10 to 20 microns; and/or a size D of the connecting portion 43 in the second direction is in a range of 10 to 15 microns; and/or the size E of the connecting portion 43 in the first direction is in a range of 6 to 8 microns.

In the embodiments of the present disclosure, the first substrate may include a third side edge 106 and a fourth side edge 107, which may be disposed opposite to each other in the second direction (the Y direction). The first heating electrode 41 may include a third electrode portion close to the third side edge 106 and a fourth electrode portion close to the fourth side edge 107. The third electrode may be configured to receive a first voltage, and the fourth electrode may be configured to receive a second voltage. The first voltage may be higher than the second voltage. Optionally, the first voltage may also be lower than the second voltage. When the circuit is connected, one end of each heating electrode group 40 in the second direction (the Y direction) is connected to the third electrode portion, and the other end of each heating electrode group 40 in the second direction (the Y direction) is connected to the fourth electrode portion.

In the embodiments of the present disclosure, the first substrate is divided into regions. The heating electrode in the first region is provided as a whole, and the heating electrode in the second region is strip-like. The areas of the orthographic projections of the heating electrodes in the second region on the first surface or the second sizes of the heating electrodes in the second region decrease in the direction from the side edge of the first substrate to the center of the first substrate, so that the heating efficiencies at various positions in the display area of the liquid crystal display panel may be balanced during the heating, and the consistency of temperature of the liquid crystal display panel may be maintained, thereby solving the problem that the temperature at the peripheral portion is lower than the temperature at the middle portion as the heat dissipation at the peripheral portion is faster in the low-temperature environment and the problem that the temperature in the display area is non-uniform.

Figure 3:
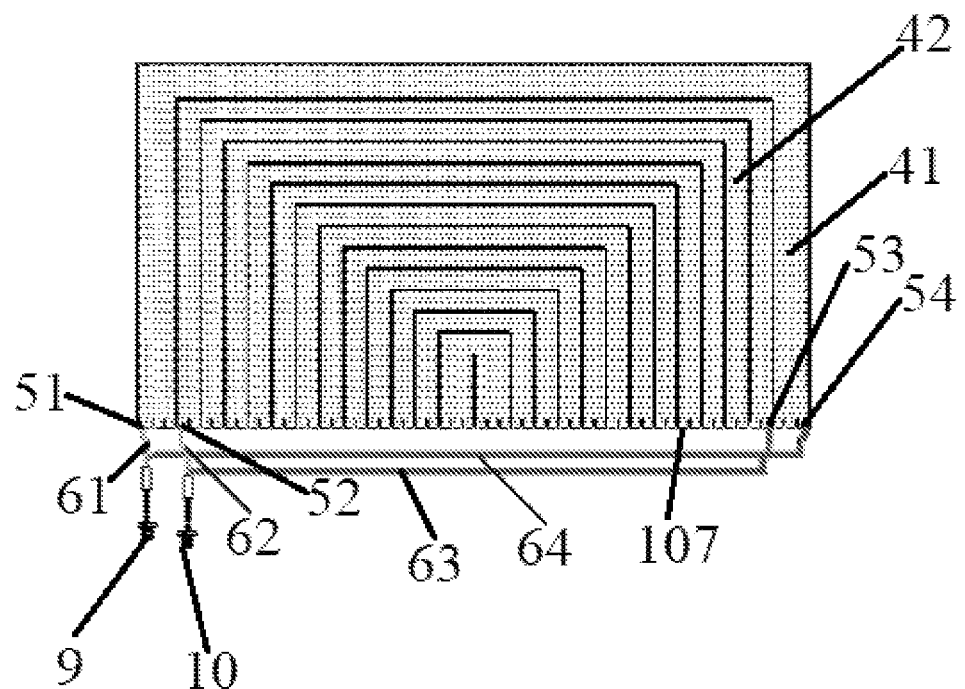
FIG. 3 shows a plan view of a first substrate according to some other embodiments of the present disclosure.

FIG. 3 shows a plan view of a first substrate according to some other embodiments of the present disclosure.

Referring to FIG. 3, the first heating electrode 41 may be a U-shaped electrode located in the first region 1, and the second heating electrode 42 may be a U-shaped electrode located in the second region.

In the embodiments of the present disclosure, the first size of the second heating electrode in the first direction may be in a range of 500 to 800 microns, and a spacing distance between two adjacent second heating electrodes in the first direction may be in a range of 20 to 50 microns. The areas of the orthographic projections of the second heating electrodes 42 on the first surface 101 may be the same, and each second heating electrode 42 may correspond to a set of positive and negative electrodes. In this embodiment, a plurality of sets of lead wires, such as a first lead wire 61, a second lead wire 62, a third lead wire 63 and a fourth lead wire 64 may be provided, and a first connector 9 and a second connector 10 may also be provided. During operation, different currents may be supplied to heat the liquid crystals, so as to solve the problem of uneven temperature in the display area of the liquid crystal display panel in the related art, and achieve the temperature consistency of the liquid crystal display panel.

In the embodiments of the present disclosure, a plurality of second heating electrodes 42 form at least one heating electrode group 40. The first heating electrode 41 may be connected to a first voltage source, and the at least one heating electrode group 40 may be connected to a second voltage source. A voltage provided by the first voltage source is different from a voltage provided by the second voltage source. Optionally, the voltage provided by the first voltage source may be higher than the voltage provided by the second voltage source. In this way, the heating rate and temperature of the first region may be higher, so as to solve the problems of fast heat dissipation at the peripheral portion of the liquid crystal display panel and uneven temperature of the liquid crystal display panel in the related art, thereby improving the heating efficiency and temperature uniformity of the liquid crystal display panel.

Figure 4A:
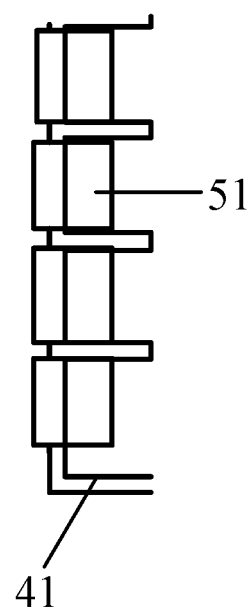
FIG. 4A shows a partial enlarged view of a pin portion according to an embodiment of the present disclosure, in which a part of the pin portion in contact with a heating electrode is schematically shown.
Figure 4B:
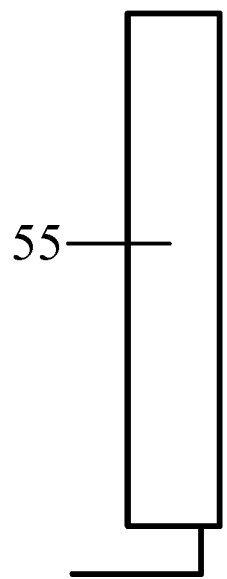
FIG. 4B shows a partial enlarged view of the pin portion according to an embodiment of the present disclosure, in which a part of the pin portion in contact with a first substrate is schematically shown.
Figure 4C:
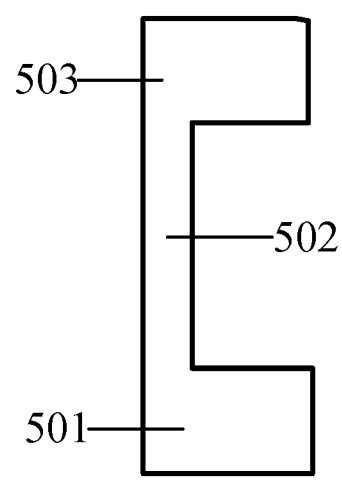
FIG. 4C shows a sectional view of a pin portion according to an embodiment of the present disclosure.

FIG. 4A shows a partial enlarged view of a pin portion according to an embodiment of the present disclosure, in which a part of the pin portion in contact with the heating electrode is schematically shown. FIG. 4B shows a partial enlarged view of a pin portion according to an embodiment of the present disclosure, in which a part of the pin portion in contact with the first substrate is schematically shown. FIG. 4C shows a sectional view of a pin portion according to an embodiment of the present disclosure.

In the embodiments of the present disclosure, the liquid crystal display panel may further include a first pin portion 51 and a second pin portion 52. The first pin portion 51 may cover the first side edge 104 of the first substrate 1, and the second pin portion 52 may cover the second side edge 105 of the first substrate 1.

Optionally, each of the first pin portion 51 and the second pin portion 52 may include a first pin sub-portion 501, a second pin sub-portion 502, and a third pin sub-portion 503. The first pin sub-portion 501 and the third pin sub-portion 503 is connected by the second pin sub-portion 502. The first pin sub-portion 501 is located on a surface of the heating electrode layer 4 away from the first substrate 1, the third pin sub-portion 503 is located on a surface of the first substrate 1 close to the second substrate 2, and the second pin sub-portion 502 is disposed to face the first side edge 104 or the second side edge 105 of the first substrate 1.

Referring to FIG. 1B, optionally, a plurality of first pin sub-portions 501 may be spaced apart in the second direction (the Y direction), a plurality of second pin sub-portions 502 may be spaced apart in the second direction (the Y direction), and a plurality of third pin sub-portions 503 may be continuous in the second direction (the Y direction). It may be understood that the third pin sub-portions 503 may be continuous on a surface without the heating electrode layer, as shown in FIG. 4B. FIG. 4B shows a partial enlarged view of the pin portion in contact with the first substrate 1, which may also be understood as a partial enlarged view of the pin portion that is not in contact with the heating electrode 41, and the fifth pin portion 55 may be formed by the continuously extending third pin sub-portions 503.

Referring to FIG. 2, in the embodiments of the present disclosure, the liquid crystal display panel may further include a first pin portion 51 and a second pin portion 52. The first pin portion 51 may cover the third side edge 106 of the first substrate 1, and the second pin portion 52 may cover the fourth side edge 107 of the first substrate 1.

Optionally, each of the first pin portion 51 and the second pin portion 52 may include a first pin sub-portion 501, a second pin sub-portion 502, and a third pin sub-portion 503. The first pin sub-portion 501 and the third pin sub-portion 503 is connected by the second pin sub-portion 502. The first pin sub-portion 501 may be located on the surface of the heating electrode layer 4 away from the first substrate 1, the third pin sub-portion 503 may be located on the surface of the first substrate 1 close to the second substrate 2, and the second pin sub-portion 502 may be disposed to face the third side edge 106 or the fourth side edge 107 of the first substrate 1.

Referring to FIG. 2, optionally, a plurality of first pin sub-portions 501 may be spaced apart in the first direction (the X direction), a plurality of second pin sub-portions 502 may be spaced apart in the first direction (the X direction), and a plurality of third pin sub-portions 503 may be continuous in the first direction (the X direction). It may be understood that the third pin sub-portions 503 may be continuous on a surface without the heating electrode layer, as shown in FIG. 4B.

Referring to FIG. 3 and FIG. 4A to FIG. 4C, the liquid crystal display panel may further include a first pin portion 51, a second pin portion 52, a third pin portion 53, and a fourth pin portion 54. The first pin portion 51, the second pin portion 52, the third pin portion 53 and the fourth pin portion 54 may cover the same side edge of the first substrate 1. The first pin portion 51 and the second pin portion 52 may be respectively connected to both ends of the first heating electrode 41, while the third pin portion 53 and the fourth pin portion 54 may be respectively connected to both ends of the at least one heating electrode group 40. Each of the first pin portion 51, the second pin portion 52, the third pin portion 53 and the fourth pin portion 54 may include a first pin sub-portion 501, a second pin sub-portion 502, and a third pin sub-portion 503. The first pin sub-portion 501 and the third pin sub-portion 503 may be connected by the second pin sub-portion 502.

Figure 5A:
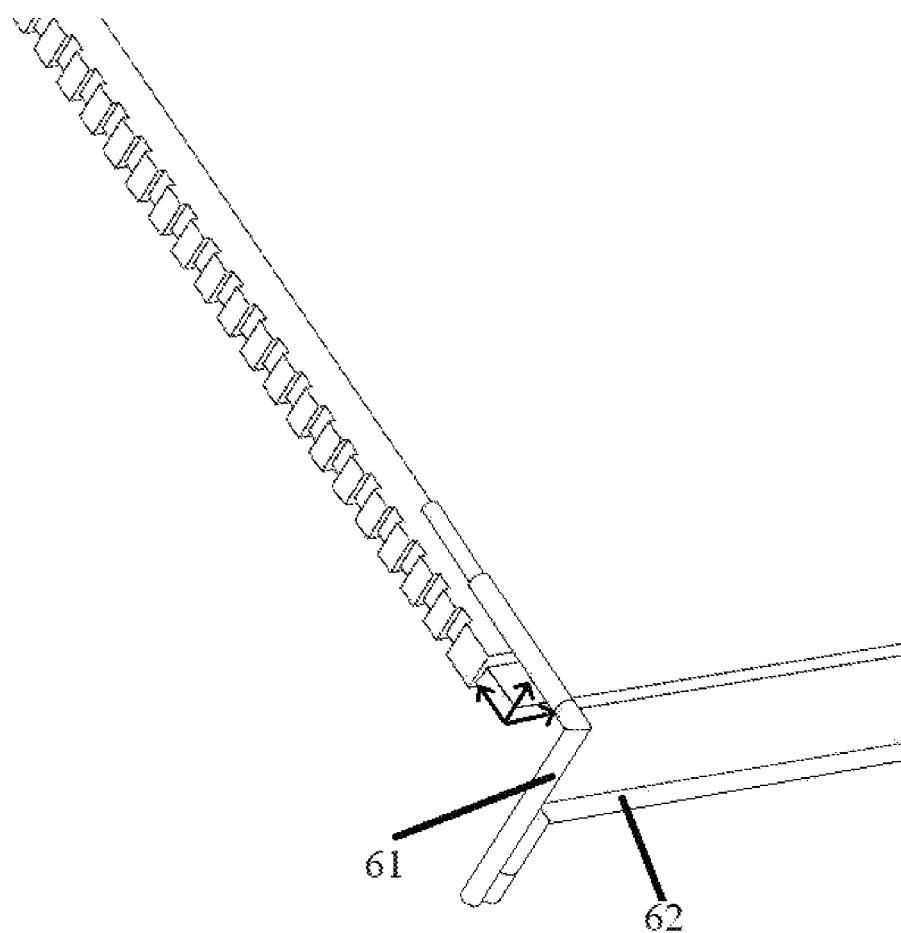
FIG. 5A shows a schematic diagram of a first lead wire and a second lead wire according to an embodiment of the present disclosure.
Figure 5B:
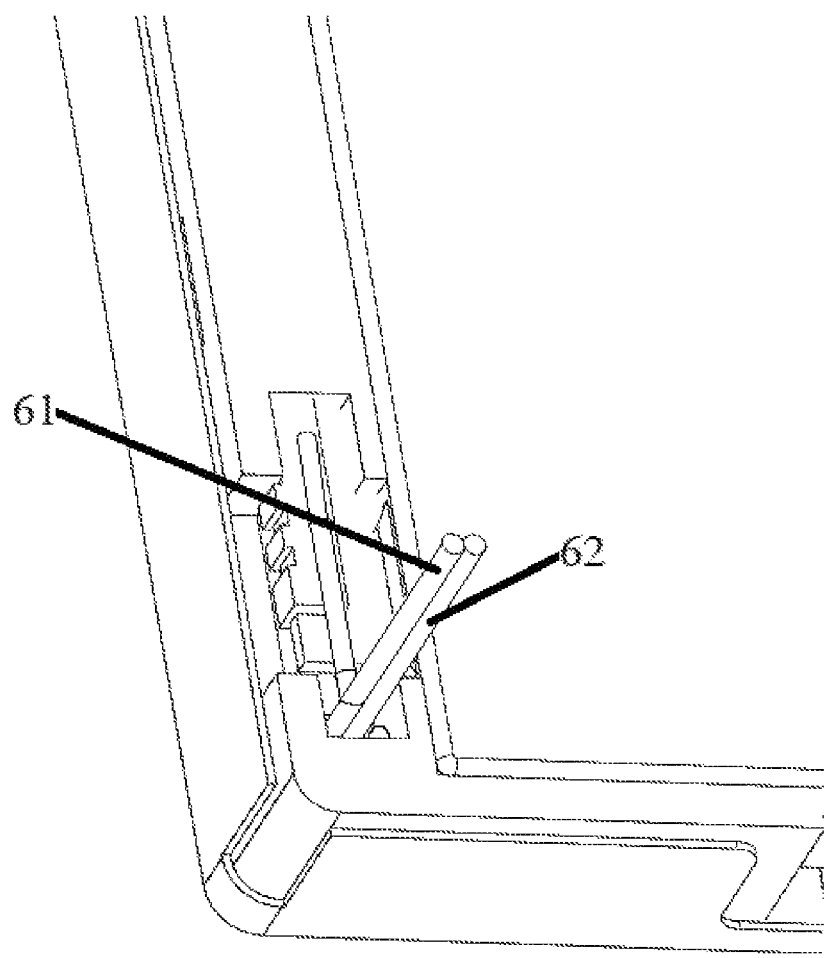
FIG. 5B shows a bottom view of FIG. 5A.

FIG. 5A shows a schematic diagram of a first lead wire and a second lead wire according to an embodiment of the present disclosure. FIG. 5B shows a bottom view of FIG. 5A.

Referring to FIG. 5A and FIG. 5B, the liquid crystal display panel may further include a first lead wire 61 and a second lead wire 62. The first lead wire 61 may be configured to receive the first voltage, and the second lead wire 62 may be configured to receive the second voltage. For example, the first lead wire 61 is configured to receive a positive voltage, and the second lead wire 62 is configured to receive a negative voltage. The second pin sub-portion 502 of the first pin portion 51 may be connected to the first lead wire 61, and the second pin sub-portion 502 of the second pin portion 52 may be connected to the second lead wire 62.

Optionally, the liquid crystal display panel may further include a first lead wire 61, a second lead wire 62, a third lead wire 63, and a fourth lead wire 64. The first lead wire 61 and the second lead wire 62 may be connected to the first voltage source, and the third lead wire 63 and the fourth lead wire 64 may be connected to the second voltage source. The second pin sub-portion 502 of the first pin portion 51 may be connected to the first lead wire 61, the second pin sub-portion 502 of the second pin portion 52 may be connected to the second lead wire 62, the second pin sub-portion 502 of the third pin portion 53 may be connected to the third lead wire 63, and the second pin sub-portion 502 of the fourth pin portion 54 may be connected to the fourth lead wire 64.

Referring to FIG. 5A and FIG. 5B, when leading out a lead wire, the lead wire may be threaded through an opening of a backlight module. Specifically, the backlight module may have an opening at each of two opposite corners, for example, an opening is provided at each of left and right corners of the backlight module, and the first lead wire 61 and the second lead wire 62 are threaded through the openings respectively. In an embodiment, it is also possible to provide one opening at a corner of the backlight module, and the first lead wire 61 and the second lead wire 62 are threaded through this opening.

In the embodiments of the present disclosure, positive and negative electrode lead wires may be connected to a power supply through a connector. The connector may be connected to the power supply to input current, so that the circuit is turned on. Metal pin portions may be designed on two long side edges of liquid crystal display device, on two short side edges of liquid crystal display device, or on the same side edge of liquid crystal display device. By connecting the heating electrode and the positive and negative electrode lead wires through the metal pin portions, which have large contact areas with the heating electrode and fast heat conduction, it is possible to improve the heating efficiency of the liquid crystal display device.

Figure 6:
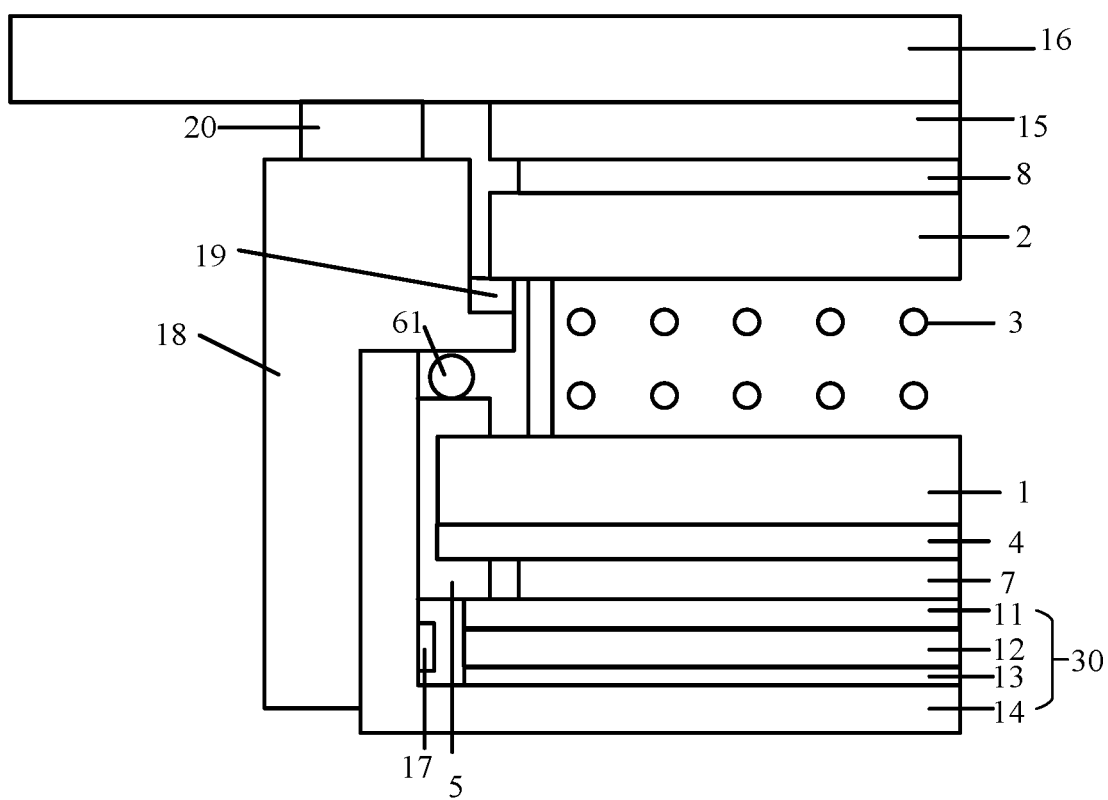
FIG. 6 shows a structural diagram of a liquid crystal display panel according to some other embodiments of the present disclosure.

FIG. 6 shows a structural diagram of a liquid crystal display panel according to some other embodiments of the present disclosure.

Referring to FIG. 6, the liquid crystal display panel may further include: a backlight module 30 on the side of the first substrate 1 away from the second substrate 2; and a first polarizer 7 between the backlight module 30 and the first substrate 1. The heating electrode layer 4 is between the first polarizer 7 and the first substrate 1.

Optionally, the backlight module 30 may include a back plate 14, a light source 17, a reflector 13, a light guide plate 12, and an optical film group 11.

The back plate 14 may be used to support and fix the light guide plate 12 and the optical film group 11, etc. The back plate 14 may include a base plate and sidewalls. The base plate may have a rectangular shape. Four sidewalls are vertically connected to a peripheral of the base plate, forming a cavity for receiving the light guide plate 12, the reflector 13, the optical film group 11 and other structures.

Optionally, the optical film group 11 may include a diffuser, an intensifier and other optical films. It should be understood that the optical film group 11 may also include other types of optical films, and the types of optical films included in the optical film group 11 may be selected according to actual usage needs.

Optionally, the light source 17 may include a plurality of light emitting diodes (LEDs).

Optionally, the liquid crystal layer 3 and the first substrate 1 may be sealed, and the liquid crystal layer 3 and the second substrate 2 may be sealed, so as to prevent a contamination to the liquid crystals.

Optionally, the heating electrode of the heating electrode layer 4 may be made of a material with high resistivity, such as ITO (indium tin oxide), IZO (indium zinc oxide), molybdenum, nickel, chromium, tungsten, etc. The material of the heating electrode may be adjusted adaptively according to actual situations.

Optionally, the liquid crystal display panel may further include the first polarizer 7 and a second polarizer 8. The first polarizer 7 may be disposed between the optical film group 11 and the heating electrode layer 4, and the second polarizer 8 may be disposed between the second substrate 2 and a bonding adhesive 15.

Optionally, the pin portion 5 may be electrically connected to the first substrate 1 and the heating electrode layer 4, and the lead wire 61 may be electrically connected to the pin portion.

Optionally, a buffering element such as buffering foam 19 is provided between a bearing surface of a rubber frame 18 and the second polarizer 8.

Optionally, a super strong double-sided adhesive tape 20 may be provided above the rubber frame 18, so that a top glass cover plate 16 may be fixed by the super strong double-sided adhesive tape 20 and the bonding adhesive 15.

In the embodiments of the present disclosure, in the first direction (the X direction), an edge of the heating electrode layer 4 is closer to the side edge of the first substrate 1 than an edge of the first polarizer 7; and/or in the second direction (the Y direction), the edge of the heating electrode layer 4 is closer to the side edge of the first substrate 1 than the edge of the first polarizer 7.

The embodiments of the present disclosure further provide a display device, which may include the liquid crystal display panel as described above. The display device may be used for a vehicle display device on a mobile object such as a car, or may be a display device such as a laptop computer. The embodiments of the present disclosure are not limited to this. For example, the display device may be any product or component with display functions, such as a smart phone, a wearable smart watch, smart glasses, a tablet computer, a television, a display, a digital photo frame, a navigator, a vehicle display, an electronic book, etc.

For example, the display device may be a vehicle electronic rearview mirror.

Figure 7:
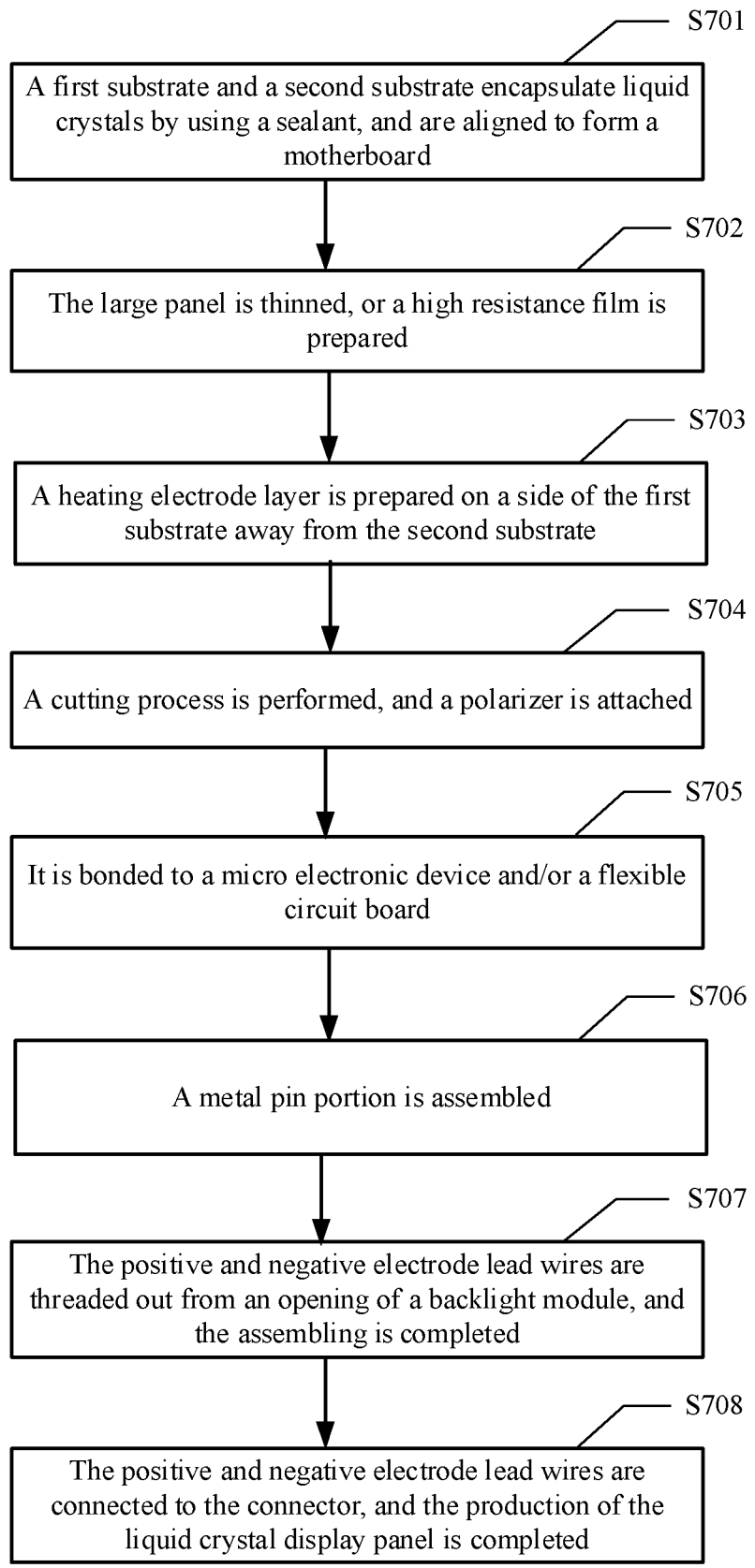
FIG. 7 shows a flowchart of a method for manufacturing a liquid crystal display panel according to an embodiment of the present disclosure.

FIG. 7 shows a flowchart of a method for manufacturing a liquid crystal display panel according to an embodiment of the present disclosure.

Referring to FIG. 7, the method includes operations S701 to S708.

In operation S701, a first substrate and a second substrate encapsulate liquid crystals by using a sealant, and are aligned to form a motherboard.

In operation S702, the large panel is thinned, or a high resistance film is prepared.

In operation S703, a heating electrode layer is prepared on a side of the first substrate away from the second substrate.

In the embodiments of the present disclosure, the heating electrode layer may be prepared with reference to the methods shown in FIG. 1B, FIG. 2 and FIG. 3.

In the embodiments of the present disclosure, after the alignment process of the first substrate and the second substrate is completed, the heating electrode is prepared on a back of the first substrate, and the heating electrode is aligned by using a mark on the first substrate, resulting in a high accuracy. A process of bonding a substrate having a heating electrode with the panel is reduced, so that the heating electrode is closer to the liquid crystal, resulting in a high heating efficiency. In addition, due to the reduction of a layer of glass substrate and OCR, the module may be thinned, so that production material costs and time costs of the liquid crystal display device may be saved.

In operation S704, a cutting process is performed, and a polarizer is attached.

In the embodiments of the present disclosure, a size of the second polarizer may be less than a size of the second substrate, so that a connection of the heating electrode to the metal pin portion is not affected.

In operation S705, it is bonded to a micro electronic device and/or a flexible circuit board.

In operation S706, a metal pin portion is assembled.

In the embodiments of the present disclosure, an arrangement of the metal pin portion may refer to FIG. 4A and FIG. 4B. A side of the metal pin portion that is in contact with the heating electrode may be as shown in FIG. 4A. A side of the metal pin portion that is not in contact with the heating electrode may be a whole metal. A wire is welded on the side that is not in contact with the heating electrode to lead out the positive and negative electrode lead wires.

In operation S707, the positive and negative electrode lead wires are threaded out from an opening of a backlight module, and the assembling is completed.

Specifically, reference may be made to FIG. 5. The backlight module may have an opening at each of two opposite corners to respectively thread the positive and negative electrode lead wires, or it may have only one opening to thread the positive and negative electrode lead wires from the same opening. The positive and negative electrode lead wires may be connected to the metal pin portion and the connector, and the connector is connected to a power supply to input current, so as to turn on the circuit.

In operation S708, the positive and negative electrode lead wires are connected to the connector, and the production of the liquid crystal display panel is completed.

Specifically, the positive and negative electrode lead wires may be connected to the power supply through the connector, and the connector is connected to the power supply to input current, so as to turn on the circuit. The first substrate obtained from FIG. 1B and FIG. 2 may have only one set of positive and negative electrodes, the same current is input, and the uniformity of the surface temperature of the liquid crystal display device may be achieved through the partition design of the first substrate. The first substrate obtained from FIG. 3 may have two (or more) sets of positive and negative electrodes, and the uniformity of the surface temperature of the liquid crystal display device may be achieved by inputting different currents.

According to the embodiments of the present disclosure, the description of the method for manufacturing the liquid crystal display panel and the description of the liquid crystal display panel and the liquid crystal display device may be referenced to each other, and details will not be repeated here.

Although some embodiments according to the general concept of the present disclosure have been illustrated and described, it should be understood by those of ordinary skill in the art that changes may be made to those embodiments without departing from the principle and spirit of the general inventive concept of the present disclosure. The scope of the present disclosure is defined by the claims and their equivalents.

What is claimed is:

1. A liquid crystal display panel, comprising:
    a first substrate;
    a second substrate opposite to the first substrate;
    a liquid crystal layer between the first substrate and the second substrate; and
    a heating electrode layer on a side of the first substrate away from the second substrate,
    wherein the heating electrode layer comprises a plurality of heating electrodes respectively configured to heat liquid crystals in the liquid crystal layer;
    wherein the first substrate comprises a first region and a second region, the first region being closer to a side edge of the first substrate than the second region, and the plurality of heating electrodes comprise a first heating electrode in the first region and at least one second heating electrode in the second region, a heating power of the first heating electrode being greater than a heating power of each of the at least one second heating electrode; and
    wherein the first heating electrode comprises a loop-like electrode in the first region, and the second heating electrode comprises a strip-like electrode in the second region.

2. The liquid crystal display panel according to claim 1, wherein the first substrate comprises a first surface away from the second substrate, and the heating electrode layer is in direct contact with the first surface.

3. The liquid crystal display panel according to claim 1, further comprising:
a backlight module on the side of the first substrate away from the second substrate; and
a first polarizer between the backlight module and the first substrate,
wherein the heating electrode layer is between the first polarizer and the first substrate.

4. The liquid crystal display panel according to claim 1, wherein an area of an orthographic projection of the first heating electrode on the first surface is greater than an area of an orthographic projection of each of the at least one second heating electrode on the first surface.

5. The liquid crystal display panel according to claim 1, wherein the heating electrode layer comprises a plurality of heating electrode groups, and at least one of the plurality of heating electrode groups comprises a plurality of second heating electrodes and a plurality of connecting portions;
wherein in the at least one heating electrode group, the plurality of second heating electrodes and the plurality of connecting portions are arranged alternately in a first direction, and two adjacent second heating electrodes are electrically connected by the connecting portion; and
wherein the plurality of heating electrode groups are arranged and spaced apart in a second direction, the second direction being different from the first direction.

6. The liquid crystal display panel according to claim 5, wherein in the at least one heating electrode group, areas of orthographic projections of the plurality of second heating electrodes on the first surface decrease in a direction from the side edge of the first substrate to a center of the first substrate.

7. The liquid crystal display panel according to claim 6, wherein each of the plurality of second heating electrodes has a first size in the first direction; and in the at least one heating electrode group, the first sizes of the plurality of second heating electrodes decrease in the direction from the side edge of the first substrate to the center of the first substrate; and
wherein each of the plurality of second heating electrodes has a second size in the second direction; and in the at least one heating electrode group, the second sizes of the plurality of second heating electrodes are substantially equal.

8. The liquid crystal display panel according to claim 7, wherein the first substrate comprises a first side edge and a second side edge, and the first side edge and the second side edge are disposed opposite to each other in the first direction;
wherein the first heating electrode comprises a first electrode portion close to the first side edge and a second electrode portion close to the second side edge;
wherein the first electrode portion is configured to receive a first voltage, the second electrode portion is configured to receive a second voltage, and the first voltage is higher than the second voltage; and
wherein each of the plurality of heating electrode groups has one end in the first direction connected to the first electrode portion, and the other end in the first direction connected to the second electrode portion.

9. The liquid crystal display panel according to claim 1, wherein the heating electrode layer comprises a plurality of heating electrode groups, and at least one of the plurality of heating electrode groups comprises a plurality of second heating electrodes and a plurality of connecting portions;
wherein in the at least one heating electrode group, the plurality of second heating electrodes and the plurality of connecting portions are arranged alternately in a second direction, and two adjacent second heating electrodes are electrically connected by the connecting portion; and
wherein the plurality of heating electrode groups are arranged and spaced apart in a first direction, the second direction being different from the first direction.

10. The liquid crystal display panel according to claim 9, wherein in the at least one heating electrode group, areas of orthographic projections of the plurality of second heating electrodes on the first surface decrease in a direction from the side edge of the first substrate to a center of the first substrate.

11. The liquid crystal display panel according to claim 10, wherein each of the plurality of second heating electrodes has a second size in the second direction; and in the at least one heating electrode group, the second sizes of the plurality of second heating electrodes decrease in the direction from the side edge of the first substrate to the center of the first substrate; and/or
wherein each of the plurality of second heating electrodes has a first size in the first direction; and in the at least one heating electrode group, the first sizes of the plurality of second heating electrodes are substantially equal.

12. The liquid crystal display panel according to claim 11, wherein the first substrate comprises a third side edge and a fourth side edge, and the third side edge and the fourth side edge are disposed opposite to each other in the second direction;
wherein the first heating electrode comprises a third electrode portion close to the third side edge and a fourth electrode portion close to the fourth side edge;
wherein the third electrode portion is configured to receive a first voltage, the fourth electrode portion is configured to receive a second voltage, and the first voltage is higher than the second voltage; and
wherein each of the plurality of heating electrode groups has one end in the second direction connected to the third electrode portion, and the other end in the second direction connected to the fourth electrode portion.

13. The liquid crystal display panel according to claim 1, wherein the liquid crystal display panel further comprises a first pin portion covering a first side edge of the first substrate and a second pin portion covering a second side edge of the first substrate.

14. The liquid crystal display panel according to claim 13, wherein each of the first pin portion and the second pin portion comprises a first pin sub-portion, a second pin sub-portion and a third pin sub-portion, and the first pin sub-portion and the third pin sub-portion is connected by the second pin sub-portion,
wherein the first pin sub-portion is on a surface of the heating electrode layer away from the first substrate, the third pin sub-portion is on a surface of the first substrate close to the second substrate, and the second pin sub-portion is disposed facing the first side edge or the second side edge of the first substrate;
wherein a plurality of first pin sub-portions are spaced apart in a second direction, a plurality of second pin sub-portions are spaced apart in the second direction, and a plurality of third pin sub-portions are continuous in the second direction; and wherein the liquid crystal display panel further comprises a first lead wire configured to receive a first voltage and a second lead wire configured to receive a second voltage, and the second pin sub-portion of the first pin portion is connected to the first lead wire, and the second pin sub-portion of the second pin portion is connected to the second lead wire.

15. The liquid crystal display panel according to claim 1, wherein the liquid crystal display panel further comprises a first pin portion covering a third side edge of the first substrate and a second pin portion covering a fourth side edge of the first substrate,
- wherein each of the first pin portion and the second pin portion comprises a first pin sub-portion, a second pin sub-portion and a third pin sub-portion, and the first pin sub-portion and the third pin sub-portion is connected by the second pin sub-portion,
- wherein the first pin sub-portion is on a surface of the heating electrode layer away from the first substrate, the third pin sub-portion is on a surface of the first substrate close to the second substrate, and the second pin sub-portion is disposed opposite to the third side edge or the fourth side edge of the first substrate;
- wherein a plurality of first pin sub-portions are spaced apart in a first direction, a plurality of second pin sub-portions are spaced apart in the first direction, and a plurality of third pin sub-portions are continuous in the first direction; and
- wherein the liquid crystal display panel further comprises a first lead wire configured to receive a first voltage and a second lead wire configured to receive a second voltage, and the second pin sub-portion of the first pin portion is connected to the first lead wire, and the second pin sub-portion of the second pin portion is connected to the second lead wire.

16. The liquid crystal display panel according to claim 1, wherein the liquid crystal display panel further comprises a first pin portion, a second pin portion, a third pin portion and a fourth pin portion, and the first pin portion, the second pin portion, the third pin portion and the fourth pin portion cover a same side edge of the first substrate,
- wherein the first pin portion and the second pin portion are respectively connected to both ends of the first heating electrode, and the third pin portion and the fourth pin portion are respectively connected to both ends of at least one heating electrode group;
- wherein each of the first pin portion, the second pin portion, the third pin portion and the fourth pin portion comprises a first pin sub-portion, a second pin sub-portion and a third pin sub-portion, and the first pin sub-portion and the third pin sub-portion is connected by the second pin sub-portion;
- wherein the liquid crystal display panel further comprises a first lead wire, a second lead wire, a third lead wire and a fourth lead wire, the first lead wire and the second lead wire are connected to a first voltage source, and the third lead wire and the fourth lead wire are connected to a second voltage source; and
- wherein the second pin sub-portion of the first pin portion is connected to the first lead wire, the second pin sub-portion of the second pin portion is connected to the second lead wire, the second pin sub-portion of the third pin portion is connected to the third lead wire, and the second pin sub-portion of the fourth sub-portion is connected to the fourth lead wire.

17. The liquid crystal display panel according to claim 3, wherein in the first direction, an edge of the heating electrode layer is closer to the side edge of the first substrate than an edge of the first polarizer; and/or
- wherein in the second direction, the edge of the heating electrode layer is closer to the side edge of the first substrate than the edge of the first polarizer.

18. A liquid crystal display device, comprising the liquid crystal display panel according to claim 1.

19. A liquid crystal display panel, comprising:
a first substrate;
a second substrate opposite to the first substrate;
a liquid crystal layer between the first substrate and the second substrate; and
a heating electrode layer on a side of the first substrate away from the second substrate,
- wherein the heating electrode layer comprises a plurality of heating electrodes respectively configured to heat liquid crystals in the liquid crystal layer;
- wherein the first substrate comprises a first region and a second region, the first region being closer to a side edge of the first substrate than the second region, and the plurality of heating electrodes comprise a first heating electrode in the first region and at least one second heating electrode in the second region, a heating power of the first heating electrode being greater than a heating power of each of the at least one second heating electrode;
- wherein the first heating electrode comprises a U-shaped electrode in the first region; and the second heating electrode comprises a U-shaped electrode in the second region;
- wherein a plurality of second heating electrodes form at least one heating electrode group; and the first heating electrode is connected to a first voltage source, the at least one heating electrode group is connected to a second voltage source, and a voltage supplied by the first voltage source is different from a voltage supplied by the second voltage source;
- wherein the first heating electrode has a first size in a first direction and a second size in a second direction, and at least one second heating electrode has a first size in the first direction and a second size in the second direction; and
- wherein the first size of the first heating electrode is greater than the first size of the second heating electrode, and/or the second size of the first heating electrode is greater than the second size of the second heating electrode.

* * * * *